United States Patent
Marshall

(10) Patent No.: US 6,210,573 B1
(45) Date of Patent: Apr. 3, 2001

(54) FILTERING DEVICE FOR REMOVING LINT FROM THE EXIT HOSE OF A WASHING MACHINE

(76) Inventor: Tony D. Marshall, 14824 Lauder, Detroit, MI (US) 48227

(*) Notice: Subject to any disclaimer, the term of this patent is extended or adjusted under 35 U.S.C. 154(b) by 0 days.

(21) Appl. No.: 09/411,819

(22) Filed: Oct. 1, 1999

(51) Int. Cl.⁷ .................................................. B01D 29/27
(52) U.S. Cl. .................... 210/238; 210/461; 210/470; 210/499; 210/462
(58) Field of Search ................................ 210/238, 459, 210/460, 461, 470, 471, 499, 462; 4/290, 291; 285/404

(56) References Cited

U.S. PATENT DOCUMENTS

| | | |
|---|---|---|
| 237,336 | 12/1881 | Stock . |
| 659,365 | 10/1900 | Waldo . |
| 1,972,264 * | 9/1934 | Hirschhorn ............... 210/470 |
| 2,391,561 | 12/1945 | Geldhof et al. . |
| 2,512,394 | 6/1950 | Sullivan . |
| 2,586,508 | 2/1952 | Brotman . |
| 2,884,947 | 5/1959 | Gerhardt . |
| 3,487,944 | 1/1970 | Tucker . |
| 3,526,323 | 9/1970 | Smith . |
| 3,638,799 | 2/1972 | Serowiecki . |
| 3,762,562 | 10/1973 | Okuniewski et al. . |
| 3,762,565 | 10/1973 | Okuniewski et al. . |
| 3,804,258 | 4/1974 | Okuniewski et al. . |
| 3,959,138 | 5/1976 | Nichols . |
| 3,960,733 | 6/1976 | Van Dieren . |
| 3,984,330 | 10/1976 | Nichols . |
| 4,123,361 | 10/1978 | Marschman . |
| 4,217,667 | 8/1980 | Whitehouse . |
| 4,287,067 | 9/1981 | Dyner . |
| 4,505,138 | 3/1985 | Lang . |
| 4,523,992 | 6/1985 | Sackett . |
| 4,566,970 | 1/1986 | Piai et al. . |
| 4,906,367 | 3/1990 | Villagomez . |
| 4,970,880 | 11/1990 | Luger . |

FOREIGN PATENT DOCUMENTS

WO 83/01268 * 4/1983 (WO) .................................. 210/499

* cited by examiner

Primary Examiner—Matthew O. Savage
(74) Attorney, Agent, or Firm—Dykema Gossett PLLC

(57) ABSTRACT

The filtering device is adapted to be removably attached to the distal end of a discharge hose of a washing machine for filtering lint and other particulate material from liquid discharge by the washing machine. The device includes an elongated tubular coupling having a generally cylindrical side wall with a centrally located axially extending passage therein, with the cylindrical side wall having an entrance end and an exit end. The centrally located passage has a diameter generally equal to the outside diameter of the hose. The side wall at the exit end has an inwardly turned flange which provides a stop for the hose when received in the centrally located passage. Removable fastening means extend through the side wall and the hose for securing the hose in place in the coupling. The exterior surface of the coupling has a pair of outwardly extending hooks. A removable and replaceable lint-collection bag has an opening for receiving at least part of the coupling and hose. The bag has a pair of hangers which are designed to fit over the hooks. The side walls of the bag is made from an expandable flexible plastic mesh with perforations. As lint accumulates and closes the perforations, the sides of the bag expands and enlarges the perforations, allowing unimpeded water passage to continue until the bag is clogged with lint and needs to be replaced.

12 Claims, 1 Drawing Sheet

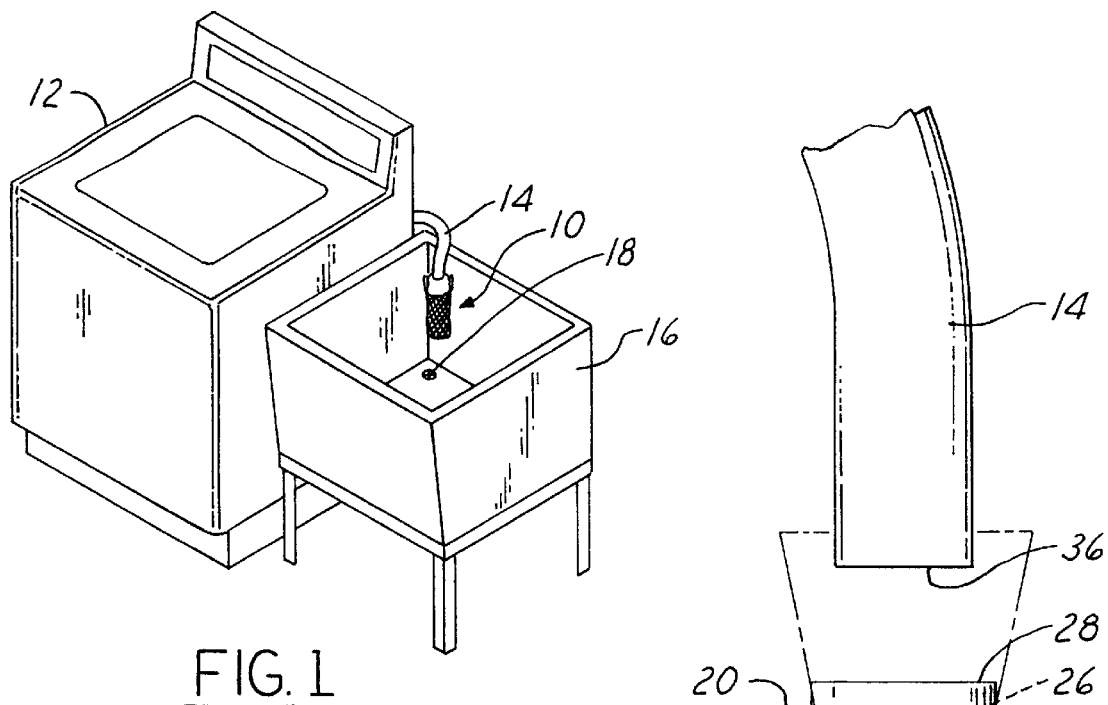
FIG. 1
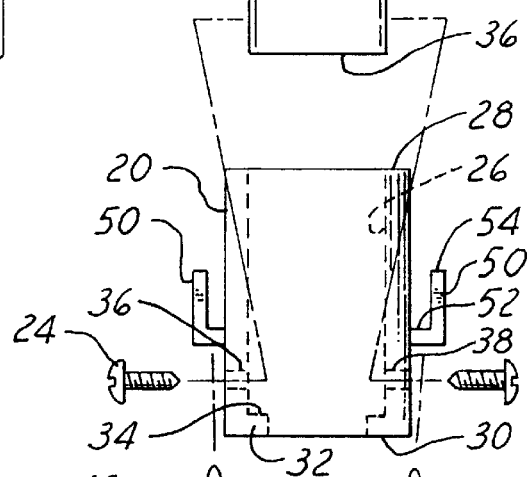
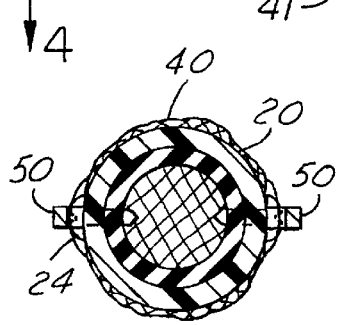
FIG. 4
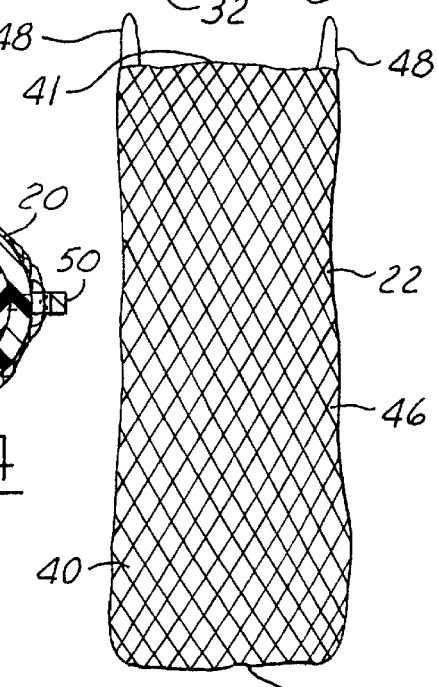
FIG. 3
FIG. 2

FILTERING DEVICE FOR REMOVING LINT FROM THE EXIT HOSE OF A WASHING MACHINE

FIELD OF THE INVENTION

This invention relates to a filtering device to trap lint discharged from the exit hose of a washing machine. More specifically, the invention relates to filtering devices located on washing machine discharge conduits or hoses which empty into sinks, basins or other drainage systems.

BACKGROUND OF THE INVENTION

One of the well-known problems with washing machines is that as water is discharged, it carries with it lint from the clothes that have been washed. The discharged lint can cause problems with drains, pipes, pumps and septic tanks in a drainage system. If the lint can be trapped by filtering before discharge of water, some of the problems can be eliminated.

Conventional clothes washers or washing machines are provided with a rubber or a plastic discharge hose or conduit through which the soapy water employed in the washing cycle is removed from the machine at the end of the cycle. Most washing machines have filters which collect the lint off the clothes during the washing cycle. During the discharge cycle, the internal lint filter is back flushed as the water is pumped out of the machine through the discharge hose.

The discharged water and lint carried thereby is customarily disposed of through existing sewers, sumps or other water draining system. A particularly common manner of disposing of the discharge water is to discharge it into a utility sink or wash basin from which the water drains to a drain and plumbing system associated therewith. The lint and other debris found in the discharge water often accumulate in and clog or plug the pipes and drains of the system. When this occurs, costly plumbing repairs frequently result.

To eliminate the lint accumulation problem, a number of filters have been proposed to remove the lint from the discharge water before it can accumulate and clog the plumbing system. A number of such filter assemblies are identified in the accompanying information disclosure statement which includes the Lewis B. Nichols U.S. Pat. No. 3,959,138, issued May 25, 1976 entitled "Washing Machine Drain Filter"; Loren H. Marschman U.S. Pat. No. 4,123,361 issued Oct. 31, 1978 entitled "Lint Filter Assembly"; Timothy A. Villagomez U.S. Pat. No. 4,906,367 issued Mar. 6, 1990 entitled "Lint Strainer for Washing Machine Drains"; and Joseph L. Luger U.S. Pat. No. 4,970,880 issued Nov. 20, 1990 entitled "Washing Machine Lint Trap".

One common method used is to secure some sort of a cloth filter over the terminal end of the discharge conduit from the washing machine. For example, women's nylon hosiery is frequency used for this purpose. However, such devices have significant drawbacks and potential problems in many cases. Clogging can occur thus impeding discharge of water. Such clogging can cause damage to the washing machine because of the inability under such conditions to evacuate itself.

Although these and other prior art devices have some merit in dealing with the lint problem, they have not provided a fully satisfactory and economical solution. One problem is that many washing machine filter devices of the prior art have little capability for trapping lint. Another problem is that it is difficult for the ultimate user to remove the filter or strainer from the washing machine, and thereafter clean and maintain the filter. The filters become full of and clogged with lint in a short period thus requiring frequent attention and maintenance. When ignored for too long a period of time, blockage problems could cause damage to the washing machines or their surroundings.

An improved washing machine lint trap, strainer or filter which has a capacity for extended use and avoids the aforementioned clogging problems is required.

SUMMARY OF THE INVENTION

A primary feature of the present invention is to provide an improved filter or screening unit for filtering the lint from the home washing machine effluent.

Another feature of the present invention is to provide a simple and inexpensive filter including a filter bag which is readily disposable and is readily accessible to the user of the washing machine.

Still another feature of the present invention is to provide a filter unit which is simple and inexpensive in construction, yet provides for continued service life until the filter bag is utilized and ready for disposal.

Still another feature of the present invention is to provide a filtering unit which has a disposable bag with a substantial lint carrying capacity and which has to be serviced only infrequently.

A further feature of the invention are realized by providing an improved filtering device adapted to be removably attached to the distal end of a liquid discharge hose, either rubber or plastic, of a washing machine for filtering lint and other particulate material from liquid discharge by the washing machine.

A still further feature of the present invention is to provide an elongated tubular coupling having a generally cylindrical side wall with a centrally located axially extending passage therein, with the cylindrical side wall having an entrance end and an exit end, with the centrally located passage having a diameter generally equal to the outside diameter hose.

Another feature of the present invention is to provide an improved filtering device with the side wall of the tubular coupling at the exit end having an inwardly turned flange which provides a stop for the hose when received in the centrally located passage. Removable fastening means extend through the side wall and the hose for securing the hose in place in the coupling.

Still another feature of the present invention is to provide the exterior surface of the coupling with a pair of outwardly extending hooks which are used to support a removable lint-collection bag which has an opening for receiving at least part of the coupling and the hose. With such a construction, the lint-collection bag is provided with pair of hangers or loops which fit over the hooks of the coupling and into which the effluent or water from the washing machine is discharged. The side walls of the bag or panels are constructed of an expandable, flexible plastic mesh material with perforations throughout. In use, as the effluent is discharged from the hose of the washing machine into the lint-collection bag, the lint accumulates within the bag and the water passes through the perforations to the drain.

Further and more specific features and advantages of the invention will appear from the description following, taken in conjunction with the accompanying drawing, illustrating by way of example, the preferred embodiment of the invention.

BRIEF DESCRIPTION OF THE DRAWINGS

The following description of the preferred embodiment is given with reference to the several views of the drawing, in which:

FIG. 1 is a perspective view of a washing machine employing the lint filtering device to protect the drainage system of a utility sink located adjacent the washing machine.

FIG. 2 is an exploded view of the preferred embodiment of the lint filtering device and conventional discharge hose.

FIG. 3 is a view of the lint filtering device in assembled form connected with the end of a washing machine discharge hose.

FIG. 4 is a sectional view though the coupling of the lint filtering device taken along the line 4—4 of FIG. 3.

DESCRIPTION OF THE PREFERRED EMBODIMENT

Referring now to FIG. 1, the lint filtering device 10 of the present invention is seen as employed with a clothes washer or washing machine 12. At the end of a washing cycle, the lint-laden water or effluent contained within washer 12 is pumped out of the washer through a discharge hose 14 and the filter assembly 10 attached to the end thereof into a utility sink or wash basin 16. The lint from the washing cycle is trapped by the filter 10. The lint-free or effluent flows out of the sides of the filter 10 into the wash basin 16 and therefrom to a drain 18 provided in the bottom of the basin 16. Water flows through a drain pipe, not shown, and thereafter into the associated plumbing system.

The lint filter assembly 10 comprises an elongated tubular housing or coupling 20, a disposable mesh plastic bag 22 and a pair of threaded fasteners or fastening elements 24 which are located 180° apart.

The elongated coupling 20 has an internal axially extending passage or passageway 26 extending from the entrance end 28 to the exit end of the coupling 20. The passageway 26 is of generally uniform diameter throughout except that the exit end 30 where the coupling 20 is provided with an inwardly turned flange 32 having an opening 33. Such flange 32 has an interior stop surface 34 which is designed to fit the bottom surface 36 of the discharge hose 14. Once the coupling 20 is installed over the discharge hose 14, with the surface hose 36 abutting the stop surface 34 of the coupling 20, it is then necessary to drill holes 36 and 38 into the coupling side wall and into the hose. Thereafter, the pair of threaded fasteners 24 are threaded into the holes 36 and 38 of the coupling and hose in order to maintain the hose 14 in a permanent position relative to the coupling 20.

As shown in FIGS. 2 and 3, an important feature of the present invention is the provision of disposable filter bags 22 which are designed to collect the lint and permit water to escape therefrom as described previously. The bag 22 may be made from a plastic mesh having predetermine arranged perforations 40 of the diamond shape configuration which permit the water to escape. Once the perforations 40 have been filled or become clogged with the lint, then the bag 22 may be disposed of in the usual manner. The plastic bag 22 is provided with an open end 41, a closed end 44 and sides, side walls or panels 46. Adjacent the upper end 41, the bag 22 is provided with a pair of handles or loops or hangers 48 similar to a conventional shopping bag. The loops or hangers 48 are made extra strong to withstand the forces of the rinse cycle.

The coupling 20 is provided with a pair of upwardly opening hooks 50 which are located 180° apart. The hooks 50 are located between the fasteners 24 and the entrance end 28 of the coupling 20. Each hook is integrally connected to the coupling 20 by means of the horizontal leg 52. With such a construction, the vertical leg 54 of each hook 50 is spaced radially outwardly from the outer surface of the coupling 20 and thereby provides a space for receiving the handle of the bag 22.

As lint accumulates within the interior of bag 22 and closes the perforations 40, the sides 46 of the bag 22 expand and enlarge the perforations 40. This allows unimpeded water passage to continue until the bag 22 is clogged with lint and needs to be replaced. Clogging is to be avoided without significant pressure buildings in the bag 22. The lint-collection bag 22, as noted in the drawings has diamond shaped perforations 40. The bag 22 including hangers 48 is removable from the hooks 50 and is replaced by another bag without removing the fastening means or fasteners 24.

In use, the loops, handles or hangers 48 of the bag 22 are inserted over the hooks 50 as shown in FIG. 3. In operation, water drains from the washing machine via the discharge hose 14 through the filter 10, with the water being discharged from the filter bag 22 through the drain 18 and to the discharge pipe, not shown. When the filter bag 22 has been expended and is no longer operating efficiently, the bag 22 is removed from the hooks 50 and is discarded. A new bag 22 may be replaced on the hooks 50 without removing the coupling 20 from the hose 14.

The hose 14 may be made from plastic or rubber as is conventional in the art. The filter bags 22 may be made from a mesh material such as a synthetic fiber like nylon. The hooks 50 may be of different configurations. As an example, the upper ends of the vertical legs may be pointed or rounded.

In use, the hose 14 is inserted into the coupling 20 until surface 36 abuts the flange stop surface 34. A person then drills the holes 36, 38 in the coupling 20, if not previously provided, and the holes in the hose 14. The screws 24, with washers not shown, are inserted. Thereafter the lint collection bag 22 is hung on the hooks 50 by means of the hangers 48.

Obviously, many modifications and variations of the present invention are possible in light of the above teachings. It is, therefore, to be understood that within the scope of the appended claims, the invention may be practiced otherwise in as specifically described.

What I claim is:

1. In a filtering device adapted to be removably attached to the distal end of a liquid discharge hose of a washing machine for filtering lint and other particulate material from liquid discharge by said washing machine, the filtering device comprising:

an elongated tubular coupling having a generally cylindrical side wall with a centrally located axially extending passage therein, said passage having an entrance end, an exit end and diameter generally equal to the outside diameter of the hose;

the side wall at said exit end having an inwardly turned flange which provides a stop for the hose when received in said centrally located passage;

removable fastening means extending through said side wall and the hose for securing the hose in place in said coupling;

the exterior surface of said coupling having a pair of radially outwardly extending hooks; and a lint-collection bag having an entrance opening for receiving at least part of said coupling and hose, said bag having a pair of hangers adjacent said entrance opening which are designed to fit over said hooks and for said bag to be entirely supported thereby;

said bag being made from an expandable flexible plastic mesh provided with perforations;

whereby as lint accumulates within the interior of said bag and closes said perforations, the sides of said bag expands and enlarges the perforations, allowing unimpeded water passage to continue and clogging to be avoided without significant pressure buildup in said bag.

2. The filtering device defined in claim 1 wherein said hooks and said hangers are located respectively 180° apart.

3. The filtering device of claim 2 wherein said lint-collection bag has diamond shape perforations and is removable from said hooks and replaced by another bag without removing said fastening means.

4. The filtering device of claim 1 wherein said removable fastening means are a pair of threaded elements which are located 180° apart.

5. The improved filtering device of claim 4 wherein said threaded elements are located on said coupling between said hooks and said flange.

6. The filtering device of claim 1 wherein said hooks are located between said removable fastening means and the entrance end of said coupling.

7. The filtering device of claim 1 wherein said lint-collection bag is made from nylon.

8. In a filtering device adapted to be removably attached to the distal end of a liquid discharge hose of a washing machine for filtering lint and other particulate material from liquid discharge by said washing machine, the filtering device comprising:

an elongated tubular coupling having a generally cylindrical side wall with a centrally located axially extending passage therein, said passage having an entrance end, an exit end and diameter generally equal to the outside diameter of the hose;

the side wall at said exit end having an inwardly turned flange which provides a stop for the hose when received in said centrally located passage;

removable fastening means extending through said side wall and the hose for securing the hose in place in said coupling;

the exterior surface of said coupling having a pair of radially outwardly extending hooks; and a removable and replaceable lint-collection bag having an entrance opening for receiving at least part of said coupling and hose, said bag having a pair of hangers adjacent said entrance opening which are designed to fit over said hooks and for said bag to be entirely supported thereby;

said bag being made from an expandable flexible plastic mesh provided with perforations;

whereby as lint accumulates within the interior of said bag and closes said perforations, the sides of said bag expands and enlarges the perforations, allowing unimpeded water passage to continue until the bag is clogged with lint and needs to be replaced;

said hooks and said hangers are located respectively 180° apart; and said removable fastening means are a pair of threaded elements which are located 180° apart.

9. The filtering device of claim 8 wherein said threaded elements are located on said coupling between said hooks and said flange.

10. The filtering device of claim 8 wherein said hooks are located between said removable fastening means and the entrance end of said coupling.

11. The filtering device of claim 8 wherein said lint-collection bag is made from nylon.

12. The filtering device of claim 8 wherein said lint-collection bag has diamond shape perforations and is removable from said hooks and replaced by another bag without removing said fastening means.

\* \* \* \* \*